3,427,048
POWERED COUPLING DEVICE
Cicero C. Brown, % Brown Oil Tools, Inc., P.O. Box 19236, Houston, Tex. 77024
Filed Jan. 3, 1966, Ser. No. 518,261
U.S. Cl. 285—18     10 Claims
Int. Cl. F16e 35/00, 19/00

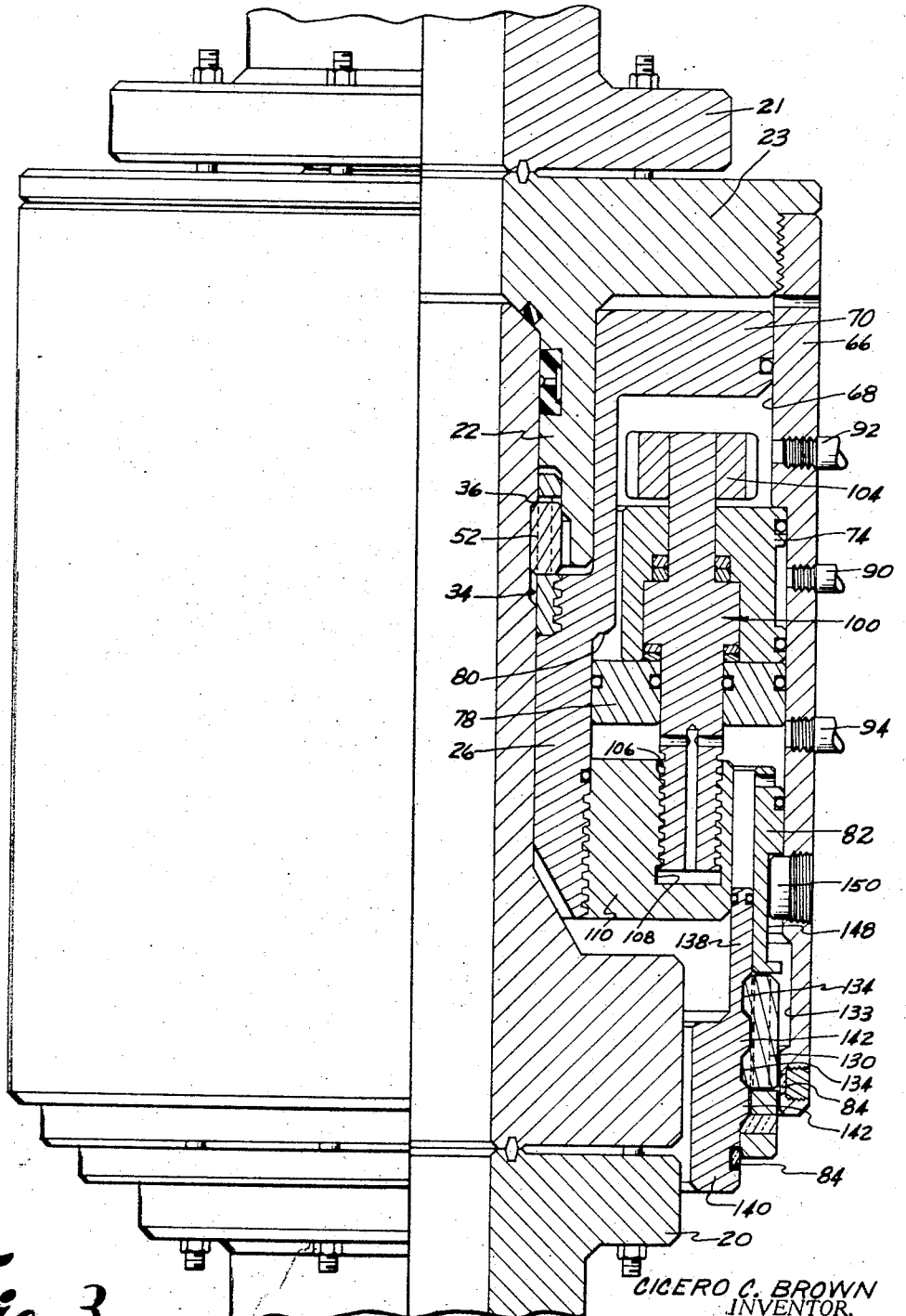

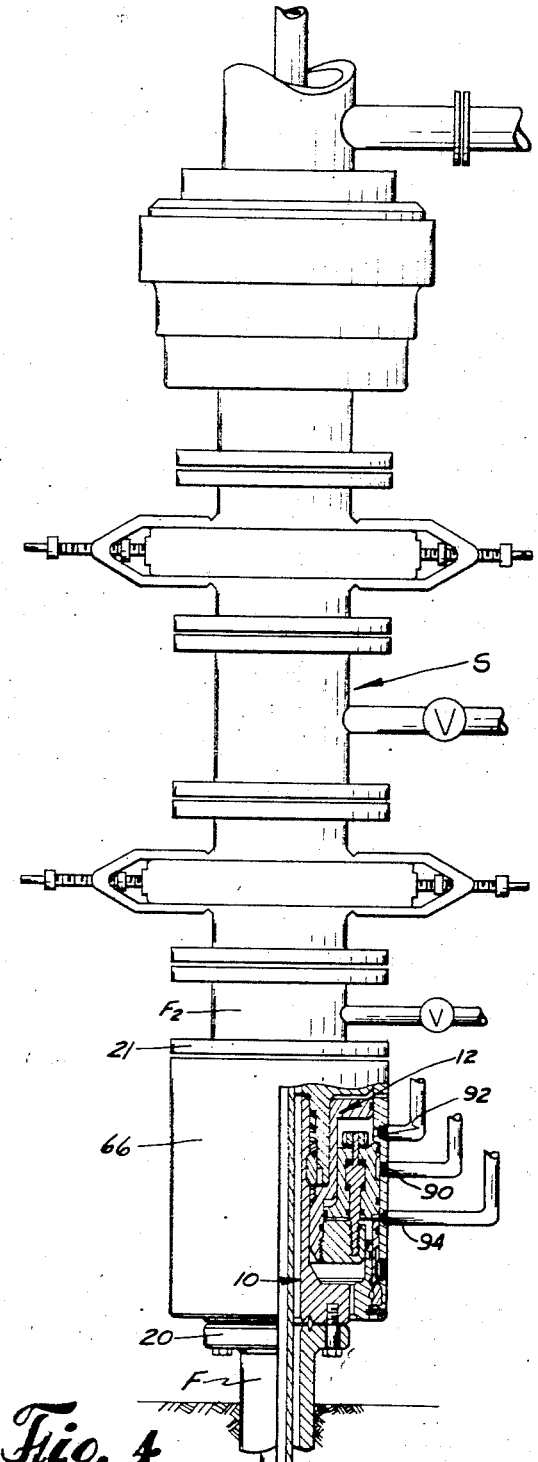
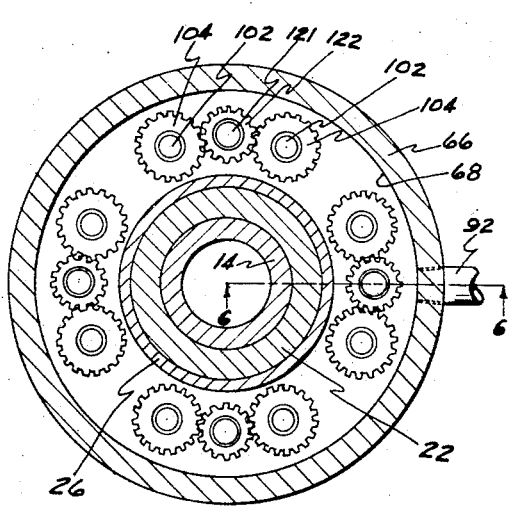

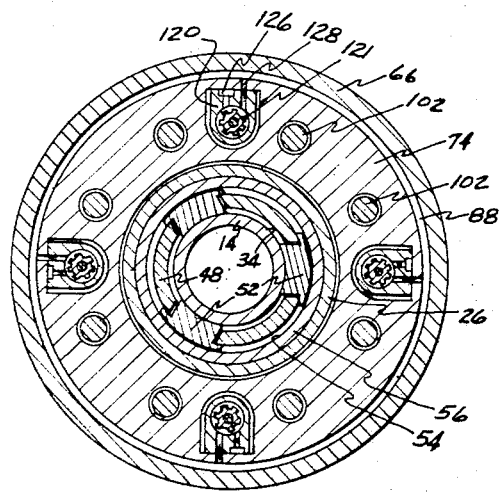
Fig. 6
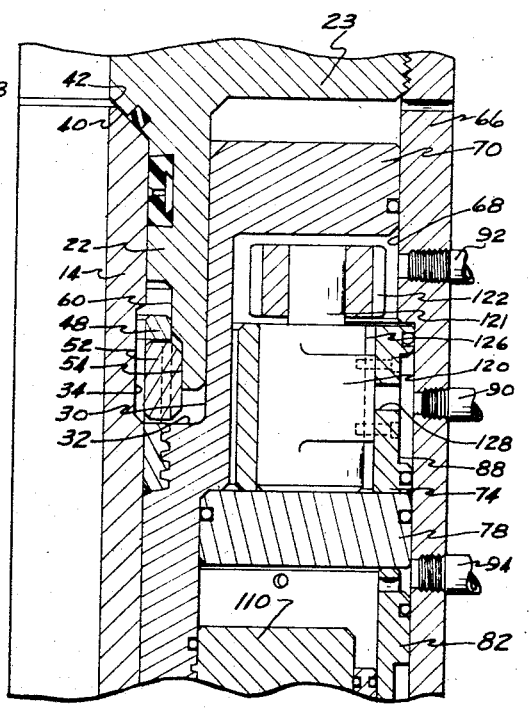
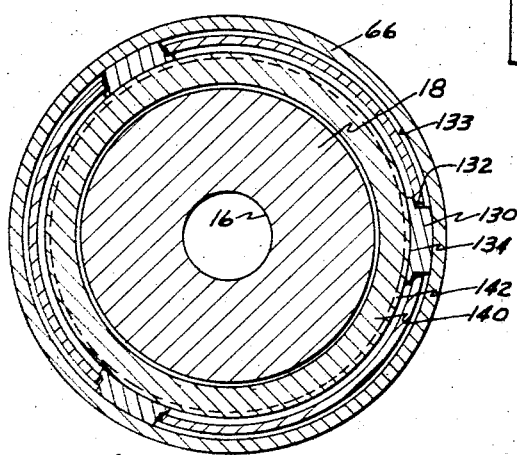
Fig. 7
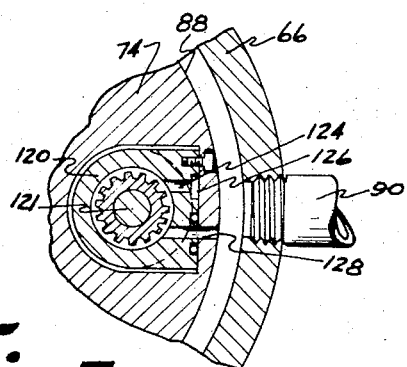
Fig. 8
Fig. 7A
CICERO C. BROWN
INVENTOR.
BY
ATTORNEY United States Patent Office 3,427,048
Patented Feb. 11, 1969

ABSTRACT OF THE DISCLOSURE

A power-operated coupling device for connecting massive tubular bodies, particularly at locations remote from the center of operations, as in connecting large diameter conductor pipe to a sub-sea wellhead. The coupling device includes a pin member sealingly received in a box member and retained therein by latch members which are operated by screw jack elements. Should the screw jack elements fail to release the latch members for uncoupling of the pin and box members an auxiliary release means is provided.

---

This invention relates to coupling devices and more particularly to powered coupling devices adapted particularly for connections between massive tubular bodies especially at remote locations.

In the drilling and equipping of oil and gas wells, particularly those being drilled through water bodies, it is frequently necessary to connect and disconnect pipe sections to and from each other and to and from various types of wellhead fittings located beneath the water surface, often at great depths.

In such marine drilling operations it is frequently necessary to connect wellhead structures to a submerged wellhead, such wellhead structures commonly comprising a rather massive assembly of fittings, valves, blowout preventors, and the like, which are ordinarily assembled in a so-called "stack" and installed as a composite unit on a suitable connection provided at the submerged wellhead.

Wherever possible it is desirable to avoid the use of divers in the sub-sea locations and to effect the connections mechanically by means operable from the surface. Because of the large diameters and massive nature of many of the structures and the connections involved, considerable power is required for making the necessary connections and to assure that the connections are sufficiently tight to withstand very great pressures which are frequently encountered.

Accordingly, it is a primary object of the present invention to provide a coupling device by which the primary connection is effected by a freely slidably telescopic movement of one member with respect to the other and whereby connection is completed by means of latch elements actuated by fluid pressure operated means carried by the coupling device and controlled from the surface.

An important object is the provision of a coupling device employing a pin member receivable in a box member, the box member comprising a pair of telescopically interconnected sections carrying latch elements engageable with the pin member in response to axial movement of the sections relative to each other effected by power-operated means.

A further object is the provision of a coupling device for effecting relative axial movement between the box of the kind described in which the power-operated means member sections comprises a plurality of screw-type jacks operably connected between the sections and driven by remotely controlled fluid operated motor means.

An additional object is the provision of a power-operated coupling device, in which the end of the pin member inserted in the box member is arranged to make a metal-to-metal seal with a cooperating seating surface in the box member under a sealing force which is greatly intensified by the action of the power-operated means in coupling the members together.

Still another object is the provision in a power-operated coupling device of the kind described of a fluid pressure actuated auxiliary release means arranged to effect release of the coupling members in the event the primary power-actuated release elements fail to function.

Summary of the invention

In accordance with a preferred embodiment of the present invention, the coupling device comprises, a tubular pin member carrying external shoulder means intermediate the ends thereof, a tubular box member having an axial bore telescopically receiving said pin member, said box member comprising coaxial, relatively telescopically engageble inner and outer sections, circumferentially spaced radially movable latch elements disposed between adjacent portions of said sections, said portions having cooperating means engageable with said latch elements urging said latch elements into and out of axial thrusting engagement with said shoulder means in response to relative axial movement between said sections, and means connecting said sections operably constructed and arranged to effect said relative axial movement of said sections, said pin and box members carrying cooperable surfaces abuttable to form a metal-to-metal seal between said members when fully engaged, said axial thrusting engagement of said latch elements with said shoulder means forcing and maintaining said abuttable surfaces in sealing engagement.

Other and more specific objects and advantages of this invention will become more readily apparent from the following detailed description when read in conjunction with the accompanying drawing which illustrates a useful embodiment in accordance with this invention.

In the drawing:

FIG. 3 is a view similar to FIG. 2, showing the position of the parts upon actuation of an auxiliary release device incorporated in the structure;

FIG. 4 is an elevational view, partly in section, showing a "stack" of wellhead fittings coupled to a wellhead by means of the coupling device in accordance with this invention;

FIG. 5 is a cross-sectional view taken along line 5—5 of FIG. 2;

FIG. 6 is a fragmentary sectional view taken generally along line 6—6 of FIG. 5;

FIG. 7 is a cross-sectional view taken along line 7—7 of FIG. 2;

FIG. 7A is a fragment of FIG. 7 on a larger scale for purposes of better illustration of a detail of the device; and FIG. 8 is a cross-sectional view taken along line 8—8 of FIG. 2.

Figure 1:
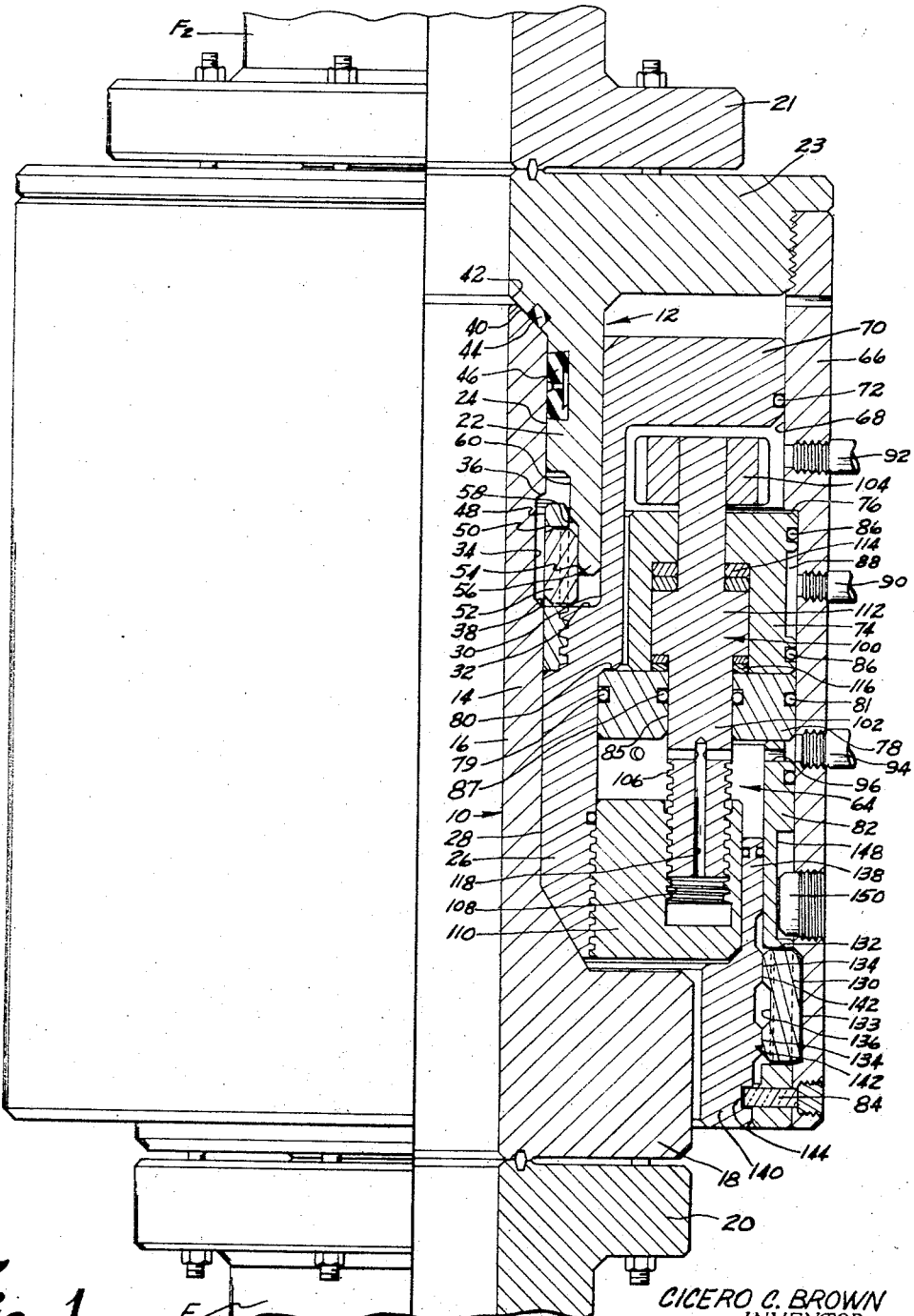
FIG. 1 is a longitudinal, quarter-sectional view of a coupling device in accordance with this invention, showing the coupling members engaged but not locked together.

Referring to the drawing, the coupling device comprises a male or pin member, designated generally by the numeral 10, and a female or box member, designated generally by the numeral 12. Pin member 10 comprises a tubular stem 14 having an axial bore 16 and terminating at one end in a radially extending bolt flange 18 by means of which the pin member may be secured to a mating bolt flange 20 of a fitting F, such as a well casinghead, to which another fitting F₂, such as a blowout preventor stack S (FIG. 4), having a bolt flange 21 at its lower end, is to be connected by means of the coupling device in accordance with this invention.

Box member 12 comprises a tubular inner section 22 having an axial bore 24 and a tubular outer section 26 having an axial bore 28 of the same diameter as bore 24. The outer end of inner section 22 is provided with an annular bolt flange 23 for attaching the same to flange 21 of fitting $F_2$. Outer section 26 is counterbored from its inner end to provide the counterbore 30 terminating in an upwardly facing annular shoulder 32 at a point intermediate the ends of the section. Counterbore 30 is adapted to receive the inner end of inner section 22 in coaxially telescopic relation so as to permit relative axial movement between the sections. Stem 14 of the pin member is provided at a point spaced from its inner or forward end with a circumferential annular recess 34 in its exterior surface, the ends of the recess being defined by forward and rear bevelled end walls 36 and 38, respectively. The forward end of stem 14 is provided with a bevelled surface 40 engageable with a correspondingly bevelled internal shoulder 42 in bore 24 adapted to form a seat for sealing engagement by surface 40 when the pin member is fully inserted in the box member, to thereby form a metal-to-metal seal between the pin and box members. Resilient annular packings 44 and 46 are inserted in shoulder 42 and in the wall of bore 24 at a point between surface 40 and recess 34 to provide auxiliary non-metallic seals between the pin and box members when the coupling is completed.

Figure 2:
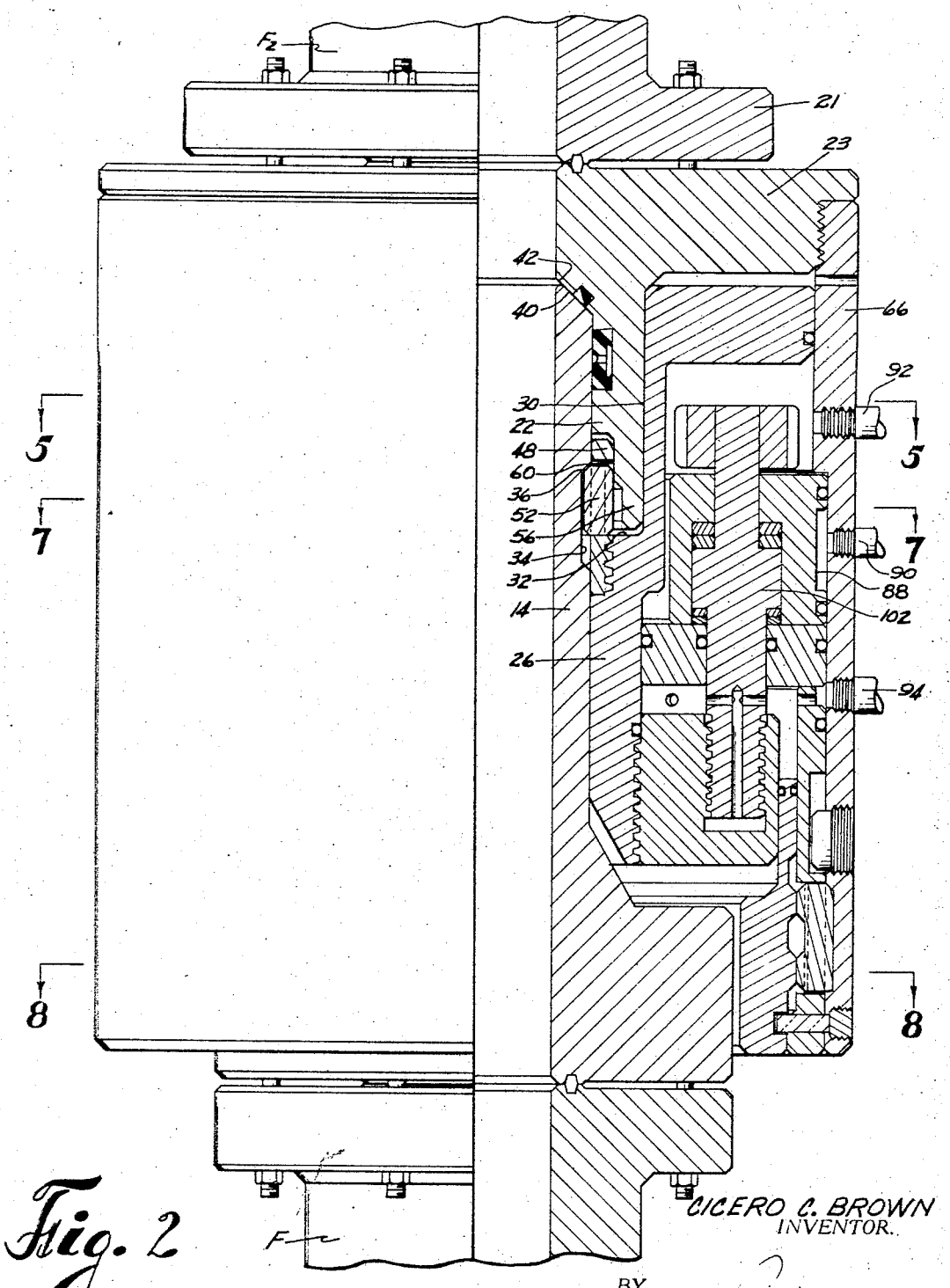
FIG. 2 is a view similar to FIG. 1, showing the parts in the position occupied when the coupling members are fully engaged and locked together.

A cage ring 48 is mounted on section 26 to project forwardly from shoulder 32 in radially spaced relation to the wall of counterbore 30. The inner periphery of cage ring 48 is made flush with bores 28 and 24 of the pin and box sections. Cage ring 48 is provided with a plurality of angularly spaced openings or windows 50 dimensioned to accommodate a plurality of latching dogs 52 for radial movement therein. The radial thickness of the latching dogs is made less than the width of counterbore 30. The inner end of box section 22 is counterbored at 54 to provide an annular nose 56 which is insertible between the latching dogs 52 and the wall of counterbore 30. Counterbore 54 terminates in a bevelled shoulder 58 which connects to a second counterbore 60 into which the upper ends of cage 48 and of dogs 52 are slidably receivable. Bevelled shoulder 58 is adapted to engage the correspondingly bevelled upper rear corners of the latching dogs in response to relative inward movement of the inner and outer sections of the box member to thereby urge dogs 52 radially outwardly of the cage and into latching recess 34 in the stem of the pin member. The latching dogs are thereby also caused to move axially inside counterbore 60, as seen in FIG. 2, and will be held in locked position in the recess by the wall of counterbore 60. At the same time, dogs 52 will be thrust against forward end wall 36 of the latching recess by the longitudinal thrust applied to the dogs by shoulder 32 in response to the telescoping relative inward movement of the box sections. It will be seen that the greater the compressive force thus applied between the sections of the box member, the greater will be the axial force applied by the latching dogs to the pin member acting to urge the latter inwardly of box section 22 and the greater the force exerted by surface 40 against seat 42 to effect the metal-to-metal seal therebetween.

The fluid-operated means by which the sections of the box member are caused to move coaxially toward and away from one another is designated generally by the numeral 64, and is enclosed and supported by a cylindrical housing 66, one end of which is threadedly secured to the periphery of flange 23 of the inner box section. Housing 66 extends longitudinally of the coupling device to a point generally opposite flange 18 of the pin member of the coupling and in radially spaced relation thereto. The annular space thus provided between housing 66 and the exterior of the box member defines an annular cylinder 68 into which the inner end of outer section 26 of the box member extends and which carries an annular piston 70 having a seal ring 72 in its outer periphery making sliding sealing engagement with the inner wall of housing 66. An annular body 74 is positioned interiorly of cylinder 68 below piston 70 surrounding the box member of the coupling and is seated at one end against an internal shoulder 76 in the wall of the housing. The opposite end of body 74 is supported by an annular cylinder cap 78 having its inner end seated against an external shoulder 80 provided on the exterior of outer section 26. The inner and outer peripheries of cap 78 are provided with seal rings 79 and 81, respectively, to seal off the end of cylinder 68 below body 74. Cylinder cap 78 is locked in place against body 74 by means of the inner end of a releasing sleeve 82 which extends into the interior of housing 66 from the lower end thereof and is secured to the wall of the housing by means of a shear pin 84. Releasing sleeve 82 forms a part of the auxiliary release means to be more fully described hereinafter. Body 74 is provided about its exterior with a pair of longitudinally spaced seal rings 86, 86 which sealingly engage the inner wall of housing 66. The exterior of body 74, between seal rings 86, is provided with an annular recess 88 forming a flow passage for pressure fluid which is in communication with a pipe connection 90 provided through the wall of housing 66. A second pipe connection 92 through the wall of housing 66 communicates with the interior of housing 66 at a point between the upper end of body 74 and piston 70, and a third pipe connection 94 through the wall of the housing communicates with the interior thereof through a radial passage 96 in the upper end of releasing sleeve 82. The pipe connections 90, 92 and 94 are provided for the introduction and discharge of pressure fluid for operation of the coupling as will be described hereinafter.

A plurality of angularly spaced screw-type jacks, designated generally by the numeral 100, are journalled in body 74 for rotation about axes generally parallel to the axis of the coupling. Each of the jacks comprises a cylindrical shaft 102, one end of which extends into cylinder 68 above the upper end of body 74 and has mounted on its outer end a spur gear 104. The opposite end of shaft 102 extends through an opening 85 in the cylinder cap having a seal ring 87 mounted therein to seal about the shaft and is provided with a section of coarse threads 106 and is threadedly received in a correspondingly threaded socket 108 provided in a tension ring 110 secured about the forward end of outer box section 26. Shaft 102 is provided with an enlarged cylindrical hub portion 112 journalled between anti-friction bearings 114 and 116 so disposed as to permit free rotataion of the jacks while preventing axial movement thereof relative to body 74. With this arrangement, it will be seen that rotation of the jacks in one direction, acting through the threaded connection to ring 110, will cause axial movement of outer box section 26 toward inner box section 22, while rotation in the opposite direction will produce axial movement of outer box section 26 away from inner box section 22. A vent passage 118 is provided in the threaded end portion of shaft 122 communicating socket 108 with the interior of housing 66 above tension ring 110 to prevent trapping of fluid between the bottom of the socket and the end of the screw jack.

To rotate the screw jacks, small fluid pressure-operated motors 120 (FIGS. 6, 7 and 7A) are mounted in body 74 adjacent each of the screw jacks. In the arrangement illustrated, the jacks are arranged in spaced pairs between which is mounted one of the motors 120 which carries on its drive shaft 121, a spur gear 122 which meshes with the spur gears 104 of both the immediately adjacent screw jacks. It will be understood that any other suitable and operative arrangement of the jacks and drive motors may be employed instead of that illustrated, wherein four pairs of jacks driven by four motors arranged on a equi-angular spacing about the coupling is provided.

Motors 120 are illustrated as of the conventional reversible gear-type, but may be of any other suitable and well-known construction, the particular design of motor employed forming no part of the present invention.

As best shown in FIGS. 6, 7 and 7A, each of the motors has a port 124 communicating with a vertical passage 126 which opens at one end into cylinder 68 above body 74, with which pipe connection 92 is in communication. Each motor is also provided with a second port 128 which communicates through the outer wall of body 74 with recess 88 which, as noted previously, is in communication with pipe connection 90. Ports 124 and 128 serve, alternatively, as inlet and discharge passages for pressure fluid circulated through the motor.

Operation of the above-described device is as follows: Pin member 10 will normally be secured in upwardly projecting position on flange 20 of fitting F. Box member 12 will have been secured to flange 21 of fitting $F_2$. The parts comprising the box member and the actuating assembly will be in the position illustrated in FIG. 1. In this position it will be seen that box sections 22 and 26 will be in their relatively retracted relation so that dogs 52 will likewise be in their radially retracted position in counterbore 54. The box member with the parts as shown in FIG. 1, and secured to fitting $F_2$ which may be the lowermost member of blowout preventor stack S (FIG. 4), will then be lowered over pin member 10 until stem 12 of the latter is fully inserted in the bore of the box member with surface 40 on the end of the pin member engaging surface 42 in the box member. At this position of the parts, it will be seen that latching recess 34 will be directly opposite dogs 52. To complete the connection between the coupling members, pressurized fluid will be supplied through pipe connection 92, from a suitable source (not shown) which might be quite remote from the coupling device, and will be introduced into cylinder 68. The fluid will flow therefrom into the inlet ports of the several motors 120, thereby driving the motors to rotate jacks 100 in a direction to apply an upward pull through tension ring 110 to outer box section 26, thereby moving the latter axially toward box esction 22. This relative inward movement of the box sections toward one another will, as illustrated particularly in FIG. 2, cause relative movement of nose portion 56 of box member 22 inwardly of counterbore 30 toward shoulder 32 for a distance sufficient to cause the thicker section of the nose portion, as defined by counterbore 60, to urge dogs 52 radially outwardly into recess 34 where the upper outer edges of the dogs will engage beneath shoulder 36. The continued relative axial movement of the box sections toward each other will act through the engagement of shoulder 32 with the adjacent ends of dogs 52 to urge stem 12 upwardly (as seen in FIG. 2) against shoulder 42, while at the same time locking the coupling members against relative retraction.

The force exerted between surfaces 40 and 42 will be dependent upon the fluid pressure applied and the mechanical action of the screw threads of the jacks and in this way the force may easily attain great magnitudes, whereby to assure a metal-to-metal seal of extreme tightness between the engaging surfaces of the coupling members. The pessurized fluid introduced into the motors will discharge therefrom into recess 88 and thence through pipe connection 90 for return to the source reservoir. When it is desired to release the coupling, the flow of pressure fluid will be reversed being introduced through pipe connection 90 and discharged through pipe connection 92, thereby reversing the direction of rotation of the motors. This will produce retractive movement of box section 26 relative to box section 22. Consequently, nose portion 56 of the inner box section 22 will be retracted relative to dogs 52 to the position shown initially in FIG. 1, thereby freeing the dogs for radial movement out of recess 34 and into counterbore 30. Thereupon upward pull applied to the box member through fitting $F_2$, or by any other means, will pull the entire box member vertically off of the pin member and thereby release the coupling.

If for any reason the jacks should fail to operate properly when it is desired to release the coupling, there is provided in the illustrative embodiment an auxiliary release means referred to previously. This release means includes releasing sleeve 82 which is provided near its lower end with a number of angularly spaced latching dogs 130 mounted in openings 132 for radial movement. The wall of housing 66 opposite dogs 130 is provided with an annular recess 133 in which the dogs are seated when in retracted position, as seen in FIGS. 1, 2 and 8. The forward faces of dogs 130 are provided with longitudinally spaced outwardly projecting lugs 134 separated by a space 136. A keeper sleeve 138 is disposed concentrically in sealed relation between the outer periphery of tension ring 110 and the inner wall of releasing sleeve 82, and has a lower end portion 140 which is disposed opposite dogs 130 and carries spaced apart outwardly projecting lugs 142 which in the locked position are in registration with lugs 134 on the latching dogs and act to retain the lugs in their retracted position in recess 133. Keeper sleeve 138 is secured in the locked position by an extension of shear pin 84 which projects into a recess 144 in the outer surface of end portion 140, as seen in FIGS. 1 and 2. The upper end of keeper sleeve 138 is exposed to pressure fluid introduced through pipe connection 94 into the interior of housing 66 below cylinder cap 78.

The exterior of latching sleeve 82 above openings 132 is provided with a longitudinal spline slot 148 and a limit pin 150 mounted in housing 66 projects into slot 148, being arranged to permit limited longitudinal movement between latching sleeve 82 and housing 66 for purposes to be described hereinafter.

The operation of the auxiliary release means is as follows: It will be assumed that the coupling is in its locked condition as seen in FIG. 2, and that for some reason the screw jacks cannot be operated to retract the box sections so as to release the coupling members. Pressure fluid will be directed through pipe connection 94 to thereby apply pressure against the inner end of keeper sleeve 138 with sufficient force to break shear pin 84 so as to effect release from housing 66 of both keeper sleeve 138 and releasing sleeve 82, as seen in FIG. 3. The resulting downward movement of the keeper sleeve relative to the latching sleeve will move lugs 142 to positions which are out of registration with lugs 134 on latching dogs 130 permitting the latter to move out of recess 133 and freeing the latching sleeve for downward movement relative to housing 66 to the extent limited by engagement of limit pin 150 with the upper end of slot 148.

With the latching sleeve thus released, housing 66 and inner box section 22 will be released for upward movement relative to outer box section 26 sufficient to release dogs 52 for retraction from recess 34. Upward movement applied through fitting $F_2$ will then be effective to withdraw the entire box member from the pin member and thereby release the coupling.

It should be noted that in applying fluid pressure for driving motors 120 to effect the contractive movement of the box sections, the fluid pressure will also act against the lower face of piston 70 and thus aid the contractive movement of outer box section 26.

Another advantage arises from the use in the above-described structure of the combination of the screw-type jacks and fluid pressure actuation of the driving motors. Thus, when the coupling is made up, the fluid pressure may be released and the screw connections between the jacks and the box section will hold the coupling members in locked relation. Likewise, once the jacks have been reversed sufficiently to release the coupling members, the parts will be retained in released position irrespective of any failure of the fluid pressure.

What I desire to secure by Letters Patent is:

1. A powered coupling device comprising, a tubular pin member carrying external shoulder means intermediate the ends thereof, a tubular box member having an axial bore telescopically receiving said pin member, said box member comprising coaxial, relatively telescopically engageable inner and outer sections, circumferentially spaced radially movable latch elements disposed between adjacent portions of said sections, said latch elements comprising cylindrical segments having substantially flat ends, said portions having cooperating means engageable with said ends of said latch elements urging said latch elements into and out of axial thrusting engagement with said shoulder means in response to relative axial movement between said sections, and means connecting said sections operably constructed and arranged to effect said relative axial movement of said sections, said box and pin member carrying cooperable surfaces abuttable to form a metal-to-metal seal between said members when fully engaged, said axial thrusting engagement of said latch elements with said shoulder means forcing and maintaining said abuttable surfaces in sealing engagement, a cylindrical housing removably enclosing said coupling device, said housing having one end secured to said inner box section, and releasable lock means securing the opposite end of said housing to said outer box section.

2. A powered coupling device according to claim 1, wherein said box and pin members carry means for connecting said members to equipments to be coupled together by said device.

3. A powered coupling device according to claim 1, wherein said means connecting said sections includes rotatable screw-jack elements interconnecting said box sections, and reversible fluid pressure operated motor means arranged for rotating said screw-jack elements.

4. A powered coupling device according to claim 1, wherein said means connecting said sections comprises a plurality of rotatable screw-jack elements disposed in uniform angularly spaced relation about said box member and threadedly connecting one of said sections to the other, and reversible power means for rotating said screw-jack elements.

5. A powered coupling device according to claim 1, wherein said releasable lock means comprises radially movable auxiliary locking dogs initially disposed in locking engagement between said housing and said outer box section, and fluid pressure operable means arranged in the housing to move said locking dogs out of said locking engagement to release said housing from said outer box section whereby to permit relative axial movement between said inner and outer sections sufficient to permit release of said latch elements, while said latch elements are held in said thrusting engagement by said cooperating means.

6. A powered coupling device according to claim 1, including an annular body positioned in the housing between the housing and the outer box section and defining therewith a pressure cylinder, said connecting means including a plurality of screw-jack elements rotatably mounted in said body and having screw-threaded connection to said outer box member whereby rotation of said screw-jack elements will produce said relative axial movement between said box sections, fluid pressure operated reversible motor means mounted in said body in driving relation to said screw-jack elements, means for supplying pressurized driving fluid to said motor means, and means for exhausting said pressurized driving fluid from said motor means.

7. A powered coupling device according to claim 6, wherein said screw-jack elements are arranged in pairs disposed in equiangular relation about the box member, there being one of said motor means arranged to drive each of said pairs of screw-jack elements.

8. A powered coupling device according to claim 1, wherein said shoulder means is defined by a circumferential recess in the exterior of said pin member having a forward end wall engageable by said latch elements.

9. A powered coupling device according to claim 1, wherein said outer box section has a counterbore for receiving said inner box member and defining an annular shoulder, and wherein the end of said inner box section received within said counterbore defines a nose portion of reduced radial thickness, said annular shoulder and said nose portions constituting said adjacent portions engageable with said latch elements.

10. A powered coupling device according to claim 9, wherein said outer box section has an annular cage mounted on said shoulder in radially spaced relation to the wall of said counterbore, said cage having radial openings in which said latch elements are mounted.

References Cited

UNITED STATES PATENTS

| | | | |
|---|---|---|---|
| 1,867,296 | 7/1932 | Woodruff | 285—341 |
| 2,962,096 | 11/1960 | Knox | 285—18 X |
| 3,147,992 | 9/1964 | Haeber et al. | 285—18 |
| 3,321,217 | 5/1967 | Ahlstone | 285—18 |
| 3,333,870 | 8/1967 | Watkins | 285—18 |
| 3,338,596 | 8/1967 | Knox | 285—18 |
| 3,361,453 | 1/1968 | Brown et al. | 285—321 |

CARL W. TOMLIN, *Primary Examiner.*

D. W. AROLA, *Assistant Examiner.*

U.S. Cl. X.R.

285—3, 142, 315, 321, 332.3, 351; 166—.6